United States Patent [19]

Eisenberg

[11] 3,915,740
[45] Oct. 28, 1975

[54] GALVANIC CELL
[75] Inventor: Morris Eisenberg, Mountain View, Calif.
[73] Assignee: Electrochimica Corporation, Mountain View, Calif.
[22] Filed: Feb. 7, 1974
[21] Appl. No.: 440,496

[52] U.S. Cl. ............... 136/6 LN; 136/20; 136/100
[51] Int. Cl.² ......................................... H01M 35/00
[58] Field of Search ........ 136/6 R, 6 LN, 6 FS, 100, 136/20, 83

[56] References Cited
UNITED STATES PATENTS
| | | | |
|---|---|---|---|
| 3,043,896 | 7/1962 | Herbert et al. | 136/6 LN |
| 3,410,730 | 11/1968 | Rightmire et al. | 136/83 R |
| 3,410,731 | 11/1968 | Rightmire et al. | 136/83 R X |
| 3,711,334 | 1/1973 | Dey et al. | 136/100 R |
| 3,808,052 | 4/1974 | Dey | 136/100 X |

Primary Examiner—John H. Mack
Assistant Examiner—C. F. Lefevour
Attorney, Agent, or Firm—Robert B. Kennedy

[57] ABSTRACT

A galvanic cell is disclosed comprising a cathode having an active material comprising a majority by weight of at least one compound of a Group V1-B metal selected from the group of metal compounds consisting of tungsten oxides, tungsten sulfides, sodium tungsten bronzes, polytungstates, polymolybdates and molybdenum sulfides. The cell also comprises an anode having at least one light weight metal selected from the group consisting of lithium, sodium, calcium, magnesium and aluminum. The cell further includes an electrolyte comprising a solvent in liquid state at room temperature for electrolytic conduction between the cathode and anode.

5 Claims, No Drawings

GALVANIC CELL

BACKGROUND OF THE INVENTION

This invention relates generally to galvanic cells, and particularly to galvanic cells of the type which employ light weight metal anodes and electrolytic solvents in liquid state at room temperature.

Heretofore, galvanic cells of the type employing light weight metal anodes such as lithium, sodium, calcium, magnesium, aluminum and alloys thereof, and electrolytic solvents of liquid state at room temperature, have exhibited several persistant adverse cell characteristics. For example, cathode depolarizers or active materials usable therewith have tended to be soluble in, or reactive with, the electrolytes resulting in poor utilization thereof. In addition, the soluble cathodic materials have also tended to migrate towards the anode where through cementation and other exchange reactions degradation of the latter occurs resulting in poor wet-stand shelf life of the cells. Such self-discharge also results in a lowering of available energy densities.

Accordingly, it is a general object of the present invention to provide an improved galvanic cell of the type employing a light weight metal anode and an electrolyte having a solvent in liquid state at standard room temperature.

Another object of the invention is to provide a galvanic cell of the type just described having relatively high electromotive force and energy density.

Another object of the invention is to provide a galvanic cell of the type described which exhibits relatively steady output voltage throughout the predominant extent of active cell life.

Another object of the invention is to provide a galvanic cell of the type described which exhibits relatively high utilization of the active cathode material and relatively long wet-stand shelf life.

Yet another object of the invention is to provide a galvanic cell of the type described the electrodes of which are chemically and dimensionally stable and which exhibit negligible gas evolution.

SUMMARY OF THE INVENTION

In one form of the invention a galvanic cell is provided comprising a cathode having an active material comprising a majority by weight of at least one compound of a Group VI-B metal of the Periodic Table of Elements selected from the group of compounds consisting of tungsten oxides, tungsten sulfides, sodium tungsten bronzes, polytungstates, polymolybdates and molybdenum sulfides. The cell also comprises an anode composed of a majority by weight of at least one light weight metal selected from the group consisting of lithium, sodium, calcium, magnesium and aluminum as an active material. The cell further includes an electrolyte comprising a solvent in liquid state at standard room temperature and a solute dissolved therein for electrolytic conduction between the cathode and anode.

DESCRIPTION OF EXEMPLARY EMBODIMENTS

Many electrolytes of diverse compositions may be used in cells constructed in accordance with principles of the invention provided they include a solvent which is in liquid state at room temperature. For each of the exemplary cells hereinafter described, which have been actually fabricated and tested, six cubic centimeters volume of a one molar solution of $LiAlCl_4$ and propylene carbonate was used. Other suitable electrolytes may be made by dissolving organic or inorganic salts of light metals in aprotic solvents of either organic or inorganic composition. For example, one to two molar solutions of lithium chloroaluminate or lithium perchlorate in propylene carbonate or tetrahydrofuran or nitromethane or their mixtures may be used as suitable organic electrolytes. Another example is a 1 to 1.5 molar solution of the above salts in phosphoryl chloride or thionyl chloride. Other light metal salts such as perchlorate, tetrachloroaluminate, tetrafluoroborate, hexafluorophosphate, and hexafluoroarsenate, dissolved in organic solvents like propylene carbonate, dimethyl sulfite, dimethyl sulfoxide, N-nitrosodimethylamine, gamma-butyrolactone, dimethyl carbonate, methylformate, butyl formate, acetonitrile, N:N dimethyl formamide, phosphoryl chloride and thionyl chloride may also be employed.

In fabricating the tungsten and molybdenum compound cathodes described in the below listed examples the compounds were mixed in powdered form with graphite as a conductive diluent in a 75 to 25% by weight ratio. To this a 3% by weight addition of a binder was added such as polytetrafluoroethylene or Teflon. A sufficient amount of an organic solvent, such as isopropanol or methylethyl ketone was then added to the mix to form a thick paste. The mix then was pasted to an expanded nickel current collector, dried, and subsequently pressed between flat platens at pressure of from five to ten tons psi. The cathode was then cured at a temperature of 300°C for one hour to enhance its mechanical integrity. In this method of cathode fabrication the weight ratio of the tungsten or molybdenum compounds to graphite can be varied from 20:1 to 1:1. The preferred ratio is 7.5:2.5.

For cell testing a current lead in each example was spotwelded to a corner of a nickel current collector of a one by one inch cathode wrapped in a piece of separator, preferably non-woven polypropylene. Two lithium anodes were prepared by pressing two rectangular pieces of a one inch square lithium metal of 0.02 inches thickness on expanded nickel metal. The electrode pack was then placed in an epoxy rectangular case with the current leads exiting the case top. The top was sealed by means of a fast curing epoxy. Following seal cure a small hole was drilled through the epoxy and the previously described electrolyte poured into the cell in an argon dry environment. Following seal cure the cell was discharged at a constant current of five milliamps.

EXAMPLE I

A cathode was prepared comprising 75% tungsten trioxide and 25% graphite. To this was added 2% by weight polyethylene powder Microthene. A small amount of xylene was added to enable thorough mixing and pasting. After the electrode was pressed and dried the rectangular cell was assembled as described above. The open circuit voltage measured 3.5 volts. When a current of 5 milliamps was applied the initial closed circuit voltage was 2.5 volts. The cell discharged for 27 hours to an end voltage of 2.0 volts. A duplicate cell was then discharged at a current of 10 milliamps. The initial closed circuit voltage for this cell was 2.7 volts and the cell operated for 11.2 hours to a cutoff voltage of 2.0 volts.

EXAMPLE II

A cathode mix was prepared using 70% by weight sodium tungstenate, 20% graphite and 10% acetylene black. 3.5% Microthene polyethylene binder dissolved in xylene was then added. After pasting, pressing and drying the electrodes the cell was assembled as previously described. These cells showed open circuit voltages of 3.55 volts. When a load was applied to pass a current of 6 milliamps the initial closed circuit voltage was 2.75 volts. The cells operated for some 23 hours to a voltage cutoff point of 2.0 volts.

EXAMPLE III

A cathode mix was prepared by blending 70% copper molybdate, 15% graphite and 15% acetylene black with an addition of 3.5% Microthene binder. After pasting, pressing and drying, a cell was assembled as described in the other examples. The cell showed an open circuit voltage of 3.6 volts. Upon application of a load of 6 milliamps the initial closed circuit voltage was 2.65 volts. The cell operated for 19 hours to a 2 volt cutoff.

EXAMPLE IV

A cell prepared with a mix similar to that of Example III, but using as the active cathode material molybdenum disulfide, gave an open circuit voltage of 3.3 volts. When a load was applied to pass the current of 4 milliamps, the initial closed circuit voltage was 2.65 volts. The cell operated for 17 hours to a 2 volt cutoff.

It should be understood that the specific examples have been presented herein merely as exemplary embodiments. Many modifications and additions may, of course, be made thereto without departure from the spirit and scope of the invention as set forth in the following claims.

I claim:

1. A galvanic cell comprising a cathode having as an active material $WS_x$ where W is tungsten, S is sulfur, and x is from 2 to 3; an anode having at least one light weight metal selected from the group consisting of lithium, sodium, calcium, magnesium and aluminum; and an electrolyte comprising an aprotic solvent in liquid state at standard room temperature and a solute dissolved therein for electrolytic conduction between said cathode and anode.

2. A galvanic cell comprising a cathode having as an active material $Na_xWO_3$ where Na is sodium, W is tungsten, O is oxygen and x is from 0.3 to 0.9; an anode having at least one light weight metal selected from the group consisting of lithium, sodium, calcium, magnesium and aluminum; and an electrolyte comprising an aprotic solvent in liquid state at standard room temperature and a solute dissolved therein for electrolytic conduction between said cathode and anode.

3. A galvanic cell comprising a cathode having as an active material $(MO)x(WO_3)$ where M is a metal, O is oxygen, W is tungsten and $x$ is from 1 to 4; an anode having at least one light weight metal selected from the group consisting of lithium, sodium, calcium, magnesium and aluminum; and an electrolyte comprising an aprotic solvent in liquid state at standard room temperature and a solute dissolved therein for electrolytic conduction between said cathode and anode.

4. A galvanic cell comprising a cathode having as an active material $MoS_x$ where Mo is molybdenum, S is sulfur, and $x$ is from 2 to 3; an anode having at least one light weight metal selected from the group consisting of lithium, sodium, calcium, magnesium and aluminum; and an electrolyte comprising an aprotic solvent in liquid state in standard room temperature and a solute dissolved therein for electrolytic conduction between said cathode and anode.

5. A galvanic cell comprising a cathode having as an active material $(MO)x(MoO_3)$ where M is a metal, O is oxygen, Mo is molybdenum, and $x$ is from 2 to 3; an anode having at least one light weight metal selected from the group consisting of lithium, sodium, calcium, magnesium and aluminum; and an electrolyte comprising an aprotic solvent in liquid state at standard room temperature and a solute dissolved therein for electrolytic conduction between said cathode and anode.

* * * * *